(12) United States Patent
Ozeki

(10) Patent No.: US 7,348,759 B2
(45) Date of Patent: Mar. 25, 2008

(54) ELECTRONIC APPARATUS, ELECTRONIC APPARATUS SYSTEM, AND OPERATION MODE SWITCHING METHOD

(75) Inventor: Akihiro Ozeki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 10/743,560

(22) Filed: Dec. 23, 2003

(65) Prior Publication Data

US 2004/0164713 A1    Aug. 26, 2004

(30) Foreign Application Priority Data

Dec. 27, 2002   (JP) .............................. 2002-380274

(51) Int. Cl.
*H01M 10/46* (2006.01)
(52) U.S. Cl. .................. 320/101; 320/137; 307/66; 307/46
(58) Field of Classification Search ................ 320/101, 320/137; 307/46, 66
See application file for complete search history.

(56) References Cited

U.S. PATENT DOCUMENTS

| | | | |
|---|---|---|---|
| 4,677,037 A | | 6/1987 | Takabayashi |
| 4,962,462 A | | 10/1990 | Fekete |
| 4,968,566 A | | 11/1990 | Lersch et al. |
| 5,604,426 A | * | 2/1997 | Okamura et al. ............ 323/282 |
| 5,714,874 A | * | 2/1998 | Bonnefoy ................... 323/299 |
| 5,780,980 A | | 7/1998 | Naito |
| 5,916,699 A | | 6/1999 | Thomas et al. |
| 5,964,309 A | | 10/1999 | Kimura et al. |
| 6,103,409 A | | 8/2000 | DiPierno Bosco et al. |
| 6,215,272 B1 | * | 4/2001 | Ohara et al. ................. 320/104 |
| 6,255,744 B1 | * | 7/2001 | Shih et al. .................... 307/66 |
| 6,301,674 B1 | * | 10/2001 | Saito et al. .................. 700/295 |
| 6,326,097 B1 | | 12/2001 | Hockaday |
| 6,369,461 B1 | * | 4/2002 | Jungreis et al. ............... 307/46 |

(Continued)

FOREIGN PATENT DOCUMENTS

EP    1 091 437 A1    4/2001

(Continued)

OTHER PUBLICATIONS

U.S. Appl. No. 10/740,843, filed Dec. 23, 2003, Akihiro Ozeki.

(Continued)

*Primary Examiner*—Adolf Berhane
*Assistant Examiner*—Samuel Berhanu
(74) *Attorney, Agent, or Firm*—Pillsbury Winthrop Shaw Pittman, LLP

(57) ABSTRACT

An electronic apparatus system of this invention includes an electronic apparatus, and a fuel cell unit which is detachable from the electronic apparatus. The fuel cell unit incorporates a DMFC that can produce electricity by chemical reaction. On the other hand, the electronic apparatus has at least two operation modes having different power consumption amounts such as a normal mode and power saving mode. Upon switching the operation mode, the electronic apparatus advises the fuel cell unit accordingly. Upon reception of this advice, the fuel cell unit compares the current output electric power of the DMFC with the power consumption amount in the operation mode after switching, and returns a message based on that comparison result. The electronic apparatus switches the operation mode based on the returned message.

4 Claims, 5 Drawing Sheets

U.S. PATENT DOCUMENTS

| | | | |
|---|---|---|---|
| 6,459,175 | B1 | 10/2002 | Potega |
| 6,649,298 | B2 | 11/2003 | Hayashi et al. |
| 6,856,497 | B2 * | 2/2005 | Suzui et al. ............... 361/42 |
| 6,858,335 | B2 * | 2/2005 | Schmidt et al. ............. 429/13 |
| 2001/0034569 | A1 * | 10/2001 | Yamamoto et al. ......... 700/295 |
| 2002/0026594 | A1 | 2/2002 | Hayashi et al. |
| 2002/0055029 | A1 | 5/2002 | Hayashi et al. |
| 2002/0056134 | A1 | 5/2002 | Abe et al. |
| 2002/0188873 | A1 | 12/2002 | Berglund et al. |
| 2003/0142467 | A1 | 7/2003 | Hackiya et al. |

FOREIGN PATENT DOCUMENTS

| | | |
|---|---|---|
| EP | 1 233 468 A2 | 8/2002 |
| GB | 1131171 | 10/1968 |
| GB | 1 304 092 | 1/1973 |
| JP | 11-154520 | 6/1999 |
| JP | 2001-339857 A | 12/2001 |
| JP | 2002-16524 A | 1/2002 |
| JP | 2002-49440 | 2/2002 |
| JP | 2002-63920 | 2/2002 |
| JP | 2002-198077 A | 7/2002 |
| WO | WO 98/56058 | 12/1998 |
| WO | WO 01/79012 A2 | 10/2000 |
| WO | WO 2004/031929 A1 | 4/2004 |
| WO | WO 2004/032269 A2 | 4/2004 |

OTHER PUBLICATIONS

U.S. Appl. No. 10/788,030, filed Feb. 27, 2004, Akihiro Ozeki.
U.S. Appl. No. 10/787,861, filed Feb. 27, 2004, Akihiro Ozeki.
U.S. Appl. No. 10/805,497, filed Mar. 22, 2004, Akihiro Ozeki.
U.S. Appl. No. 10/806,334, filed Mar. 23, 2004, Akihiro Ozeki.
Hironosuke Ikeda, "All About Fuel Cells," Nippon Jitsugyo Publishing Co., Ltd., p. 216-217, (Aug. 20, 2001).
Jaesung Han et al., "Direct methanol fuel-cell combined with a small back-up battery," Journal of Power Sources 112, Elsevier Science B.V., p. 477-483, (Aug. 3, 2002).
European Search Report dated Feb. 22, 2006 for Appln. No. 03029311.2-2224.
U.S. Appl. No. 10/826,910, filed Apr. 19, 2004, Shuji Abe
U.S. Appl. No. 10/848,064, filed May 19, 2004, Shuji Abe.
U.S. Appl. No. 10/860,788, filed Jun. 4, 2004, Shuji Abe.

* cited by examiner

ELECTRONIC APPARATUS, ELECTRONIC APPARATUS SYSTEM, AND OPERATION MODE SWITCHING METHOD

CROSS-REFERENCE TO RELATED APPLICATIONS

This application is based upon and claims the benefit of priority from the prior Japanese Patent Application No. 2002-380274, filed Dec. 27, 2002, the entire contents of which are incorporated herein by reference.

BACKGROUND OF THE INVENTION

1. Field of the Invention

The present invention relates to an operation control technique of an electronic apparatus system which can operate using, e.g., a direct methanol fuel cell as a power supply.

2. Description of the Related Art

In recent years, various portable electronic apparatuses such as a portable information terminal called a PDA (Personal Digital Assistant), digital camera, and the like, which can be driven by a battery, have been developed and are prevalent.

Also, recently, environmental problems are widely recognized, and the development of environment-friendly batteries has been extensively made. As a battery of this type, a direct methanol fuel cell (to be abbreviated as DMFC hereinafter) is well known.

This DMFC produces electrical energy by the chemical reaction of methanol as fuel and oxygen. The DMFC has a structure in which two electrodes made up of a porous metal or carbon sandwich an electrolyte (e.g., Hironosuke Ikeda, "All About Fuel Cells", NIPPON JITSUGYO PUBLISHING, CO., LTD., Aug. 20, 2001, pp. 216-217). Since this DMFC does not produce any hazardous waste, its practical application is strongly demanded.

The DMFC uses an auxiliary mechanism such as a pump or the like to increase the output electric power per unit volume. Therefore, the output electric power of the DMFC can be controlled by controlling the operation ratio of this auxiliary mechanism.

However, in this case, when, for example, the load electric power is measured, and the output electric power of the DMFC is controlled based on the measurement result, a long delay is produced. That is, the electronic apparatus system which operates using the DMFC as a power supply requires a mechanism for attaining a smooth output change of the DMFC.

BRIEF SUMMARY OF THE INVENTION

According to an embodiment of the present invention, an electronic apparatus which can operate by electric power supplied from a cell unit that can produce electricity by chemical reaction, comprises a switching unit which can switch an operation mode between a first operation mode that makes an operation with a first power consumption amount, and a second operation mode that makes an operation with a second power consumption amount lower than the first power consumption amount, a notification unit configured to send a signal indicating that the operation mode is switched to the cell unit, and a control unit configured to switch the operation mode on the basis of a signal sent back from the cell unit in response to the signal of the notification unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiments of the present invention will be described below with reference to the drawings.

First Embodiment

The first embodiment of the present invention will be described first.

Figure 1:
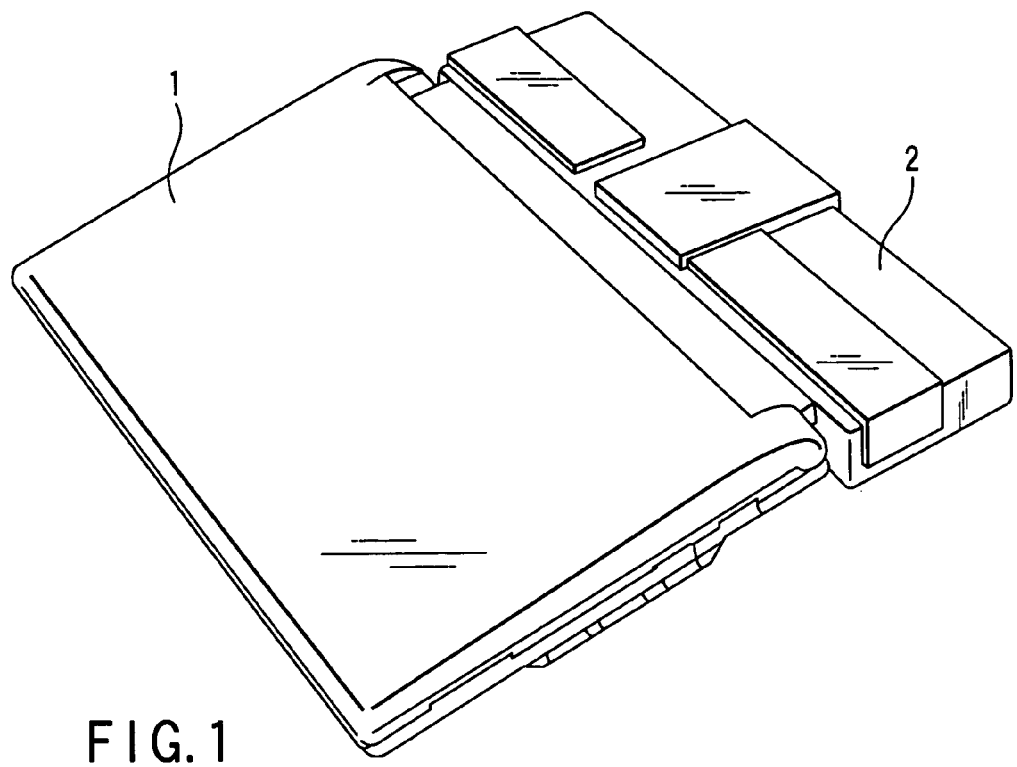
FIG. 1 shows the outer appearance of an electronic apparatus system according to the first embodiment of the present invention.

FIG. 1 shows the outer appearance of an electronic apparatus system according to an embodiment of the present invention.

As shown in FIG. 1, an electronic apparatus system of this embodiment comprises an electronic apparatus 1 and a fuel cell unit 2 which is detachable from the electronic apparatus 1. The electronic apparatus 1 is a notebook type personal computer which is formed by attaching via a hinge mechanism a lid unit which has an LCD (Liquid Crystal Display) on its inner surface to a main body unit to freely open/close. The electronic apparatus 1 can operate by electric power supplied from the fuel cell unit 2. Two LEDs (Light Emitting Diodes; not shown) are provided to the front surface of the main body unit of this electronic apparatus 1, i.e., a nearly vertical surface which is exposed even when the lid unit is closed. On the other hand, the fuel cell unit 2 incorporates a DMFC that can produce electricity by chemical reaction.

Figure 2:
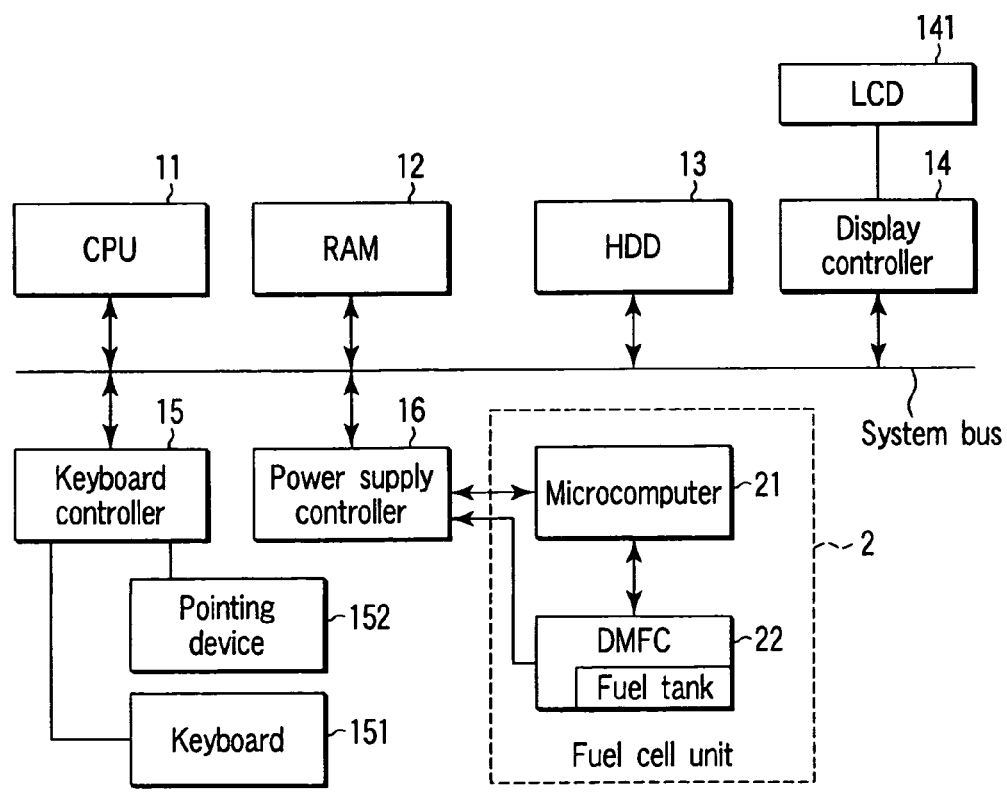
FIG. 2 is a schematic block diagram showing the arrangement of an electronic apparatus and a fuel cell unit, which is attached/detached to/from this electronic apparatus, according to the first embodiment of the present invention.

FIG. 2 is a schematic block diagram showing the arrangement of the electronic apparatus 1 and the fuel cell unit 2 which is attached/detached to/from the electronic apparatus 1.

The electronic apparatus 1 has at least two operation modes having different power consumption amounts such as a normal mode and power saving mode. As shown in FIG. 2, a CPU 11, main memory (RAM) 12, HDD 13, display controller 14, keyboard controller 15, and power supply controller 16 are connected to a system bus.

The CPU 11 controls the operation of the overall electronic apparatus 1, and executes various programs stored in the main memory 12. The RAM 12 is a storage medium serving as a main storage of this electronic apparatus 1, and stores various programs to be executed by the CPU 11 and various data used by these programs. On the other hand, the HDD 13 is a storage medium serving as an external storage of this electronic apparatus 1, and stores various programs and various data in large quantities as an auxiliary unit of the RAM 12.

The display controller 14 is responsible for the output side of a user interface of this electronic apparatus 1, and controls an LCD 141 to display image data generated by the CPU 11. On the other hand, the keyboard controller 15 is responsible for the input side of the user interface of the electronic apparatus 1. The keyboard controller 15 converts operations of a keyboard 151 and pointing device 152 into numerical values, and passes them to the CPU 11 via internal registers.

The power supply controller 16 controls power supply to the respective units in the electronic apparatus 1. The power supply controller 16 has a power reception function of receiving power supply from the fuel cell unit 2, and a communication function of exchanging signals with the fuel cell unit 2.

The fuel cell unit 2 attached/detached to/from the electronic apparatus 1 has a microcomputer 21 and DMFC 22.

The microcomputer 21 controls the operation of the overall fuel cell unit 2, and has a communication function of exchanging signals with the electronic apparatus 1. A partner on the electronic apparatus 1 side with which the microcomputer 21 exchanges signals is the aforementioned power supply controller 16. The DMFC 22 has a detachable cartridge type fuel tank, and outputs electric power produced upon chemically reacting methanol stored in this fuel tank with air (oxygen). This chemical reaction is made in a reactor called a cell stack. In order to efficiently supply methanol and air to this cell stack, the DMFC 22 comprises an auxiliary mechanism such as a pump and the like. The DMFC has a function of controlling the operation ratio of the auxiliary mechanism, i.e., the output of the pump and the like in accordance with an instruction from the microcomputer 21.

The electronic apparatus system is characterized by attaining a smooth output change of the DMFC 22 upon changing the operation mode of the electronic apparatus 1 by collaboration of the electronic apparatus 1 and fuel cell unit 2 via communications between the power supply controller 16 and microcomputer 21. This characteristic feature will be described in detail below.

Figure 3A:
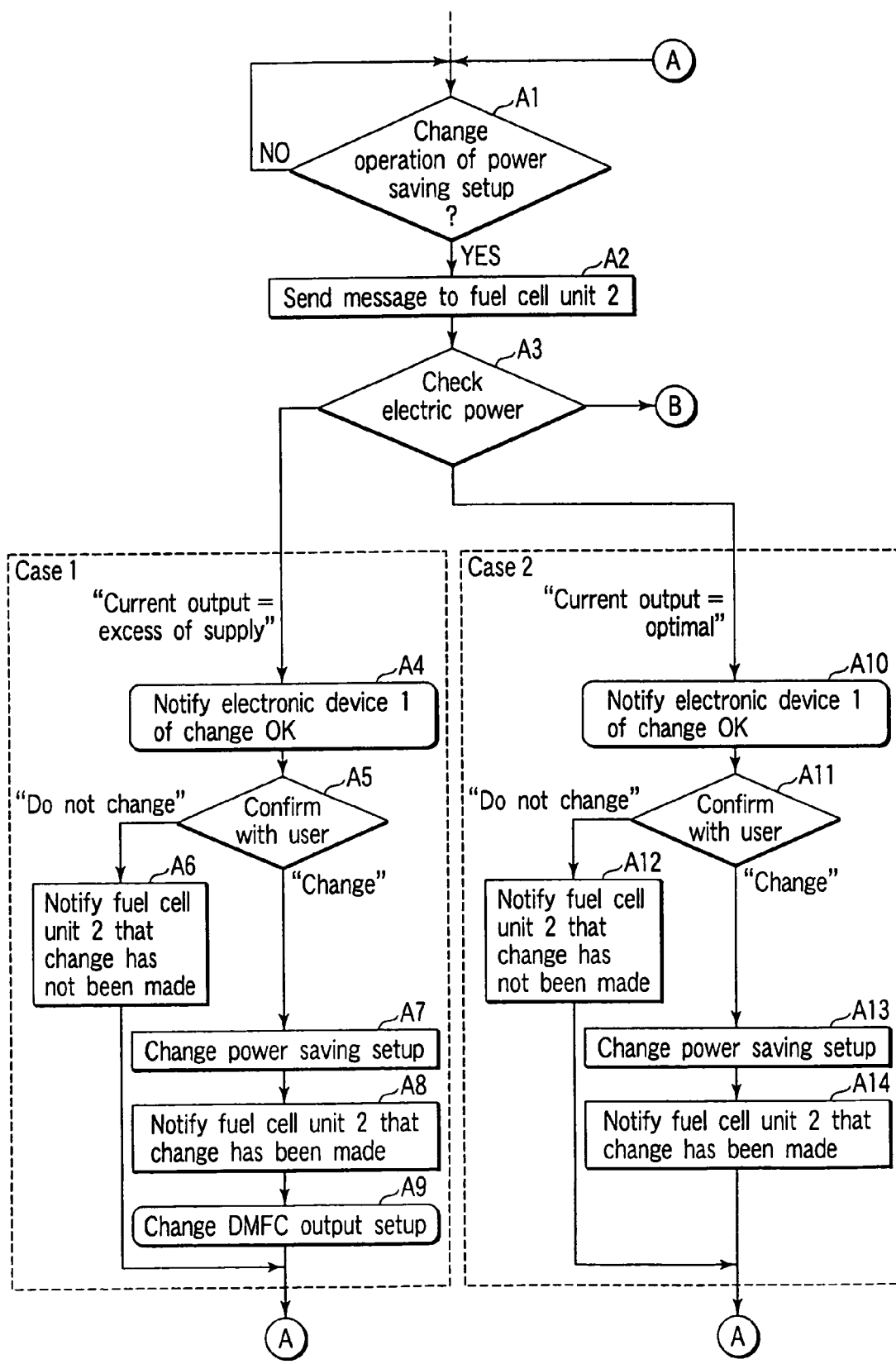
FIGS. 3A and 3B are flowcharts showing the operation sequence of the electronic apparatus system according to the first embodiment of the present invention upon switching an operation mode.
Figure 3B:
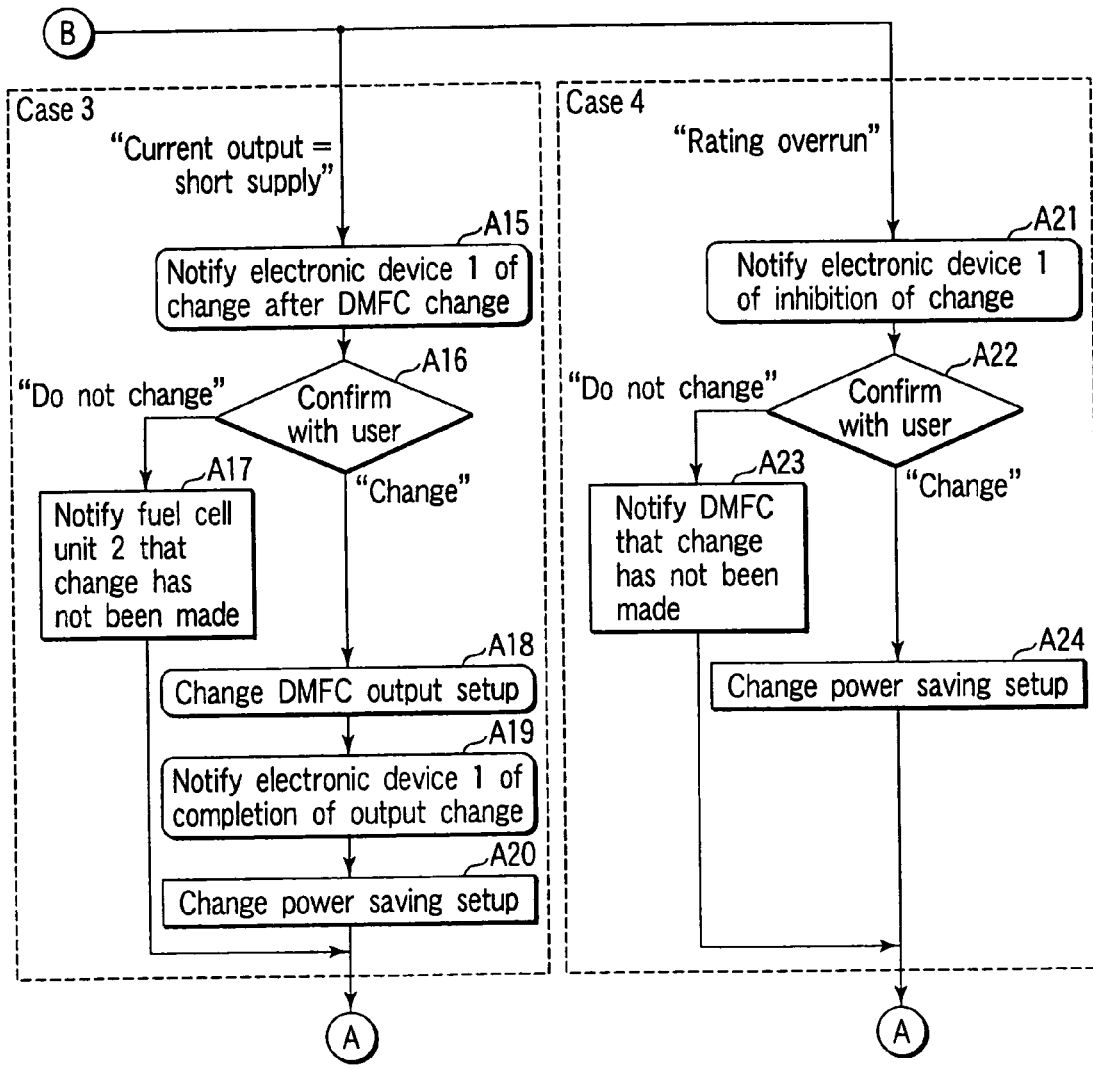

FIGS. 3A and 3B are flowcharts showing the operation sequence of the electronic apparatus system of the first embodiment upon switching the operation mode.

If a change operation of a power saving setup, i.e., a change operation of the operation mode has been made (YES in step A1), the power supply controller 16 of the electronic apparatus 1 advises the microcomputer 21 of the fuel cell unit 2 accordingly (step A2). Upon reception of this advice, the microcomputer 21 of the fuel cell unit 2 compares and determines the power consumption amount in the operation mode after change designated by that message (signal), and the current output electric power of the DMFC 22 (step A3).

If the current output is an excess of supply (Case 1), the microcomputer 21 of the fuel cell unit 2 sends a message that permits the change to the power supply controller 16 of the electronic apparatus 1 (step A4). If the power supply controller 16 receives this message, the CPU 11 of the electronic apparatus 1 displays a change confirmation dialog on the LCD 141 (step A5). Upon reception of a "do not change" instruction, the power supply controller 16 of the electronic apparatus 1 notifies the microcomputer 21 of the fuel cell unit 2 that the operation mode is not to be changed (step A6). In this case, the microcomputer 21 of the fuel cell unit 2 skips control for changing the output electric power of the DMFC 22.

On other hand, upon reception of a "change" instruction on the confirmation dialog, the CPU 11 of the electronic apparatus 1 changes the operation mode (step A7). After that, the power supply controller 16 of the electronic apparatus 1 notifies the micro-computer 21 of the fuel cell unit 2 that the operation mode has been changed (step A8). Upon reception of this notification, the microcomputer 21 controls to lower the output electric power of the DMFC 22 (step A9).

If the current output is optimal (Case 2), the microcomputer 21 of the fuel cell unit 2 sends a message that permits the change to the power supply controller 16 of the electronic apparatus 1 (step A10). If the power supply controller 16 receives this message, the CPU 11 of the electronic apparatus 1 displays a change confirmation dialog on the LCD 141 (step A11). Upon reception of a "do not change" instruction, the power supply controller 16 of the electronic apparatus 1 notifies the microcomputer 21 of the fuel cell unit 2 that the operation mode is not to be changed (step A12). In this case, the microcomputer 21 of the fuel cell unit 2 skips control for changing the output electric power of the DMFC 22, as in the above case.

On other hand, upon reception of a "change" instruction on the confirmation dialog, the CPU 11 of the electronic apparatus 1 changes the operation mode (step A13). After that, the power supply controller 16 of the electronic apparatus 1 notifies the microcomputer 21 of the fuel cell unit 2 that the operation mode has been changed (step A14).

If the current output is short supply (Case 3), the microcomputer 21 of the fuel cell unit 2 sends a message that permits the change to the power supply controller 16 of the electronic apparatus 1 after the output electric power of the DMFC 22 has been changed (step A15). If the power supply controller 16 receives this message, the CPU 11 of the electronic apparatus 1 displays a change confirmation dialog on the LCD 141 (step A16). Upon reception of a "do not change" instruction, the power supply controller 16 of the electronic apparatus 1 notifies the microcomputer 21 of the fuel cell unit 2 that the operation mode is not to be changed (step A17). In this case, the microcomputer 21 of the fuel cell unit 2 skips control for changing the output electric power of the DMFC 22, as in the above case.

On other hand, upon reception of a "change" instruction on the confirmation dialog, the power supply controller 16 of the electronic apparatus 1 advises the microcomputer 21 of the fuel cell unit 2 accordingly. Upon reception of this advice, the microcomputer 2 of the fuel cell unit 2 controls to raise the output electric power of the DMFC 22 (step A18). After that, the microcomputer 21 of the fuel cell unit 2 notifies the power supply controller 16 of the electronic apparatus 1 of completion of change in output electric power of the DMFC 22 (step A19). If the power supply controller 16 receives this notification, the CPU 11 of the electronic apparatus 1 changes the operation mode (step A20).

If the current output is a rating overrun (Case 4), the microcomputer 21 of the fuel cell unit 2 sends a message that inhibits the change to the power supply controller 16 of the electronic apparatus 1 (step A21). If the power supply controller 16 receives this message, the CPU 11 of the electronic apparatus 1 displays a change confirmation dialog on the LCD 141 (step A22). Upon reception of a "do not change" instruction, the power supply controller 16 of the electronic apparatus 1 notifies the microcomputer 21 of the fuel cell unit 2 that the operation mode is not to be changed (step A23). In this case, the microcomputer 21 of the fuel cell unit 2 skips control for changing the output electric power of the DMFC 22, as in the above case.

On the other hand, upon reception of a "change" instruction on the confirmation dialog although the change inhibition message is sent, the CPU 11 of the electronic apparatus 1 selects an operation mode closest to user's choice within a possible range, and changes the operation mode (step A24).

As described above, in the electronic apparatus system of this embodiment, a smooth output change of the DMFC 22 can be attained by collaboration of the electronic apparatus 1 and fuel cell unit 2.

Second Embodiment

The second embodiment of the present invention will be described below.

Figure 4:
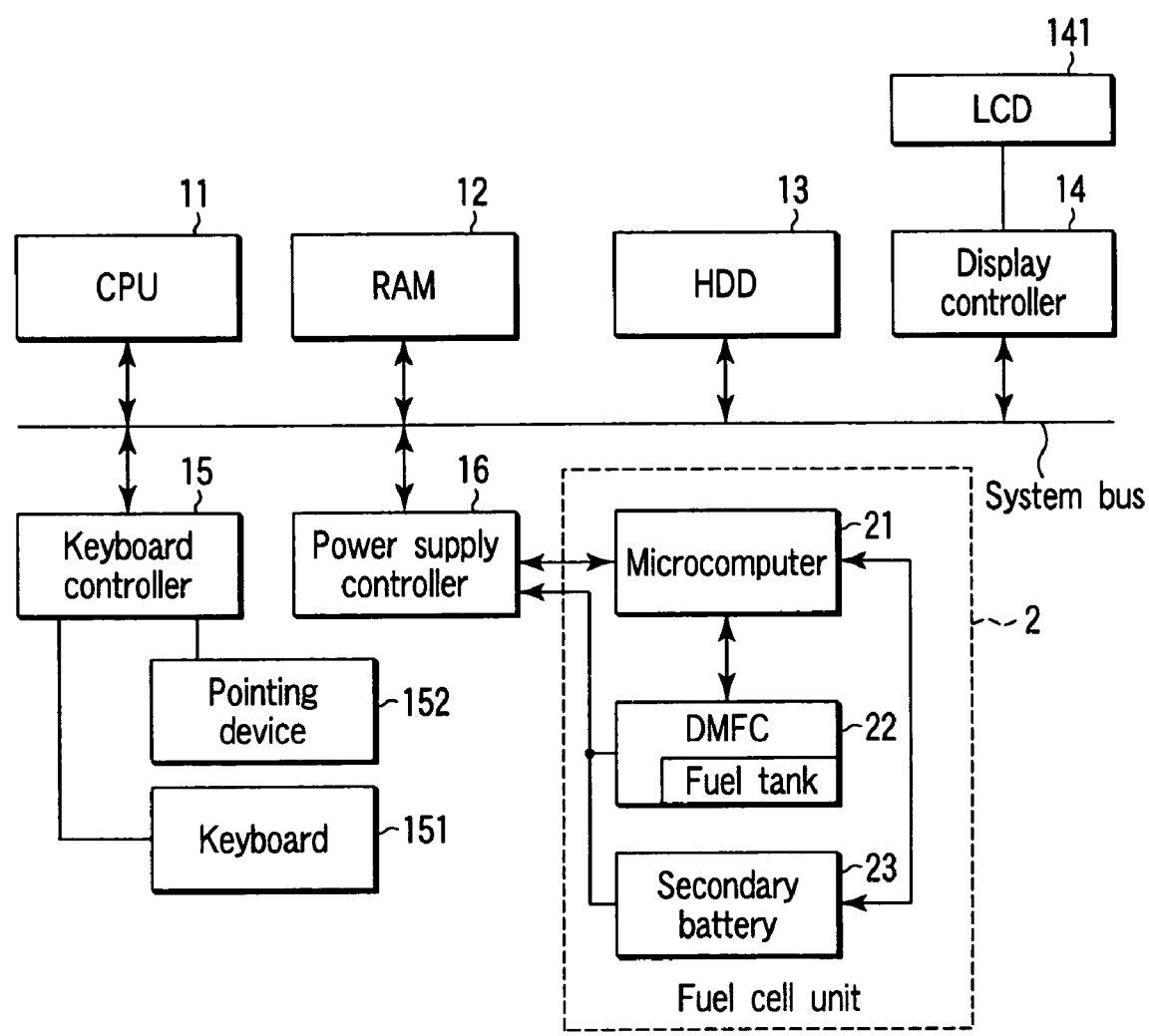
FIG. 4 is a schematic block diagram showing the arrangement of an electronic apparatus and a fuel cell unit, which is attached/detached to/from this electronic apparatus, according to the second embodiment of the present invention.

FIG. 4 is a schematic block diagram showing the arrangement of an electronic apparatus 1 and a fuel cell unit 2, which is attached/detached to/from this electronic apparatus 1, in the second embodiment.

The difference between the electronic apparatus system of the second embodiment and that of the aforementioned first embodiment is that the fuel cell unit 2 further incorporates a rechargeable secondary battery 23. The operation sequence upon switching of the operation mode in the second embodiment in which the fuel cell unit 2 further incorporates the secondary battery 23 will be described below with reference to FIG. 5.

Figure 5:
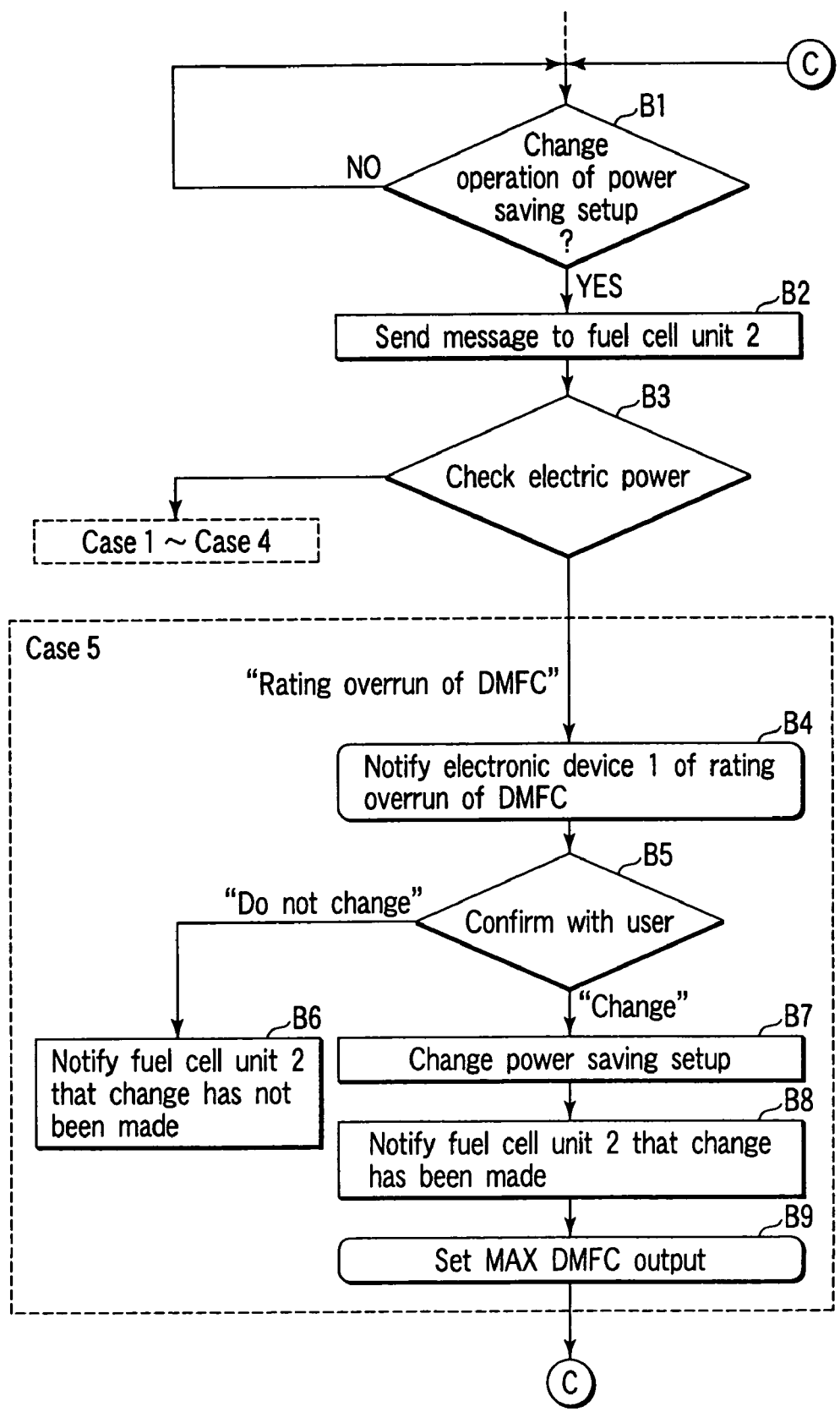
FIG. 5 is a flowchart showing the operation sequence of the electronic apparatus system according to the second embodiment of the present invention upon switching an operation mode.

In FIG. 5, steps B1 to B3 correspond to steps A1 to A3 in FIG. 3A, and only a description after these steps will be given. Also, the processes to be executed when the current output is optimal (Case 2), short supply (Case 3), and a rating overrun (Case 4) are the same as those shown in FIGS. 3A and 3B, and a description thereof will be omitted.

A difference when the current output is an excess of supply (Case 1) will be explained first with reference to FIG. 3A.

If the current output is an excess of supply (Case 1), the CPU 11 of the electronic apparatus 1 changes the operation mode (step A7) upon reception of a "change" instruction from the user. The power supply controller 16 of the electronic apparatus 1 notifies the microcomputer 21 of the fuel cell unit 2 that the operation mode has been changed (step A8). Upon reception of this notification, the microcomputer 21 controls to lower the output electric power of the DMFC 22 (step A9). However, in the electronic apparatus system of the second embodiment, the following processes are also executed.

That is, the remaining capacity of the secondary battery 23 is detected. If the remaining capacity of the secondary battery 23 is equal to or smaller than a predetermined value, the excessive electric power is used to charge the secondary battery 23. If the charged capacity of the secondary battery 23 becomes equal to or larger than the predetermined value or the secondary battery 23 is fully charged, the change control is made to lower the output electric power which is sufficient for the changed operation mode.

In the electronic apparatus system of the first embodiment, since the fuel cell unit 2 incorporates the DMFC 22 alone, the rated output of the fuel cell unit 2 matches that of the DMFC 22. That is, the rating overrun of Case 4 means an overrun of the rated output electric power as the fuel cell unit 3. By contrast, in the electronic apparatus system of the second embodiment, since the fuel cell unit 2 further incorporates the secondary battery 23, the rated output of the fuel cell unit 2 does not match that of the DMFC 22. That is, the current output may overrun the rated output of the DMFC 22, but may fall within the rated output of the fuel cell unit 2. Such a case will be explained below as Case 5.

If the current output is a rating overrun of the DMFC (Case 5), the microcomputer 21 of the fuel cell unit 2 advises the power supply controller 16 of the electronic apparatus 1 accordingly (step B4). If the power supply controller 16 receives this advice, the CPU 11 of the electronic apparatus 1 displays a change confirmation dialog on the LCD 141 (step B5). Upon reception of a "do not change" instruction, the power supply controller 16 of the electronic apparatus 1 notifies the microcomputer 21 of the fuel cell unit 2 that the operation mode is not to be changed (step B6). In this case, the microcomputer 21 of the fuel cell unit 2 skips control for changing the output electric power of the DMFC 22, as in the above case.

On the other hand, upon reception of a "change" instruction on the confirmation dialog, the CPU 11 of the electronic apparatus 1 changes the operation mode (step B7). After that, the power supply controller 16 of the electronic apparatus 1 notifies the microcomputer 21 of the fuel cell unit 2 that the operation mode has been changed (step B8). Upon reception of this notification, the microcomputer 21 controls to maximize the output electric power of the DMFC 22 (step B9). In this case, the difference between the power consumption amount after the operation mode has been changed and the output electric power of the DMFC 22 is compensated for by the secondary battery 23.

As described above, the electronic apparatus systems of the first and second embodiments can attain a smooth output change of the DMFC 22 by collaboration of the electronic apparatus 1 and fuel cell unit 2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cell unit which is detachably connected to an electronic apparatus and supplies the electronic apparatus with electric power, the electronic apparatus having a plurality of operation modes having different power consumption requirements, the cell unit comprising:

a fuel cell which produces electricity by chemical reaction;

a rechargeable secondary battery;

a reception unit configured to receive a message which indicates a switch in the operation modes from the electronic apparatus; and a response unit configured to send message to the electronic apparatus indicating that the power consumption required to operate the electronic apparatus in the newly-switched operation mode overruns the rated output of the fuel cell, but still falls within the rated output of the cell unit when:

the required power consumption to operate the electronic apparatus in the switched operation mode exceeds an electric power that is supplied from the fuel cell, and the required power consumption amount is lower than an electric power that is supplied from both the fuel cell and the secondary battery.

2. The cell unit according to claim 1, further comprising:
a power control unit configured to control the fuel cell to lower the output electric power, when the output electric power of the fuel cell is larger than the required power consumption amount by a value beyond a predetermined value.

3. The cell unit according to claim 1, further comprising:
a power control unit configured to control the fuel cell to raise the output electric power, when the required power consumption is larger than the output electric power of the fuel cell, wherein
the response unit sends a message indicating that the output electric power of the fuel cell has been changed to the electronic apparatus, when the output electric power of the fuel cell has reached the required power consumption amount under the control of the power control unit.

4. The cell unit according to claim 1, further comprising:
a power control unit configured to charge the secondary battery by electric power as a difference between the output electric power of the fuel cell and required power consumption when the output electric power of the fuel cell is larger than the required power consumption amount by a value beyond a predetermined value.

* * * * *